United States Patent
Matsumura et al.

(10) Patent No.: US 11,418,308 B2
(45) Date of Patent: Aug. 16, 2022

(54) TERMINAL, BASE STATION, AND RADIO COMMUNICATION METHOD

(71) Applicant: NTT DOCOMO, INC., Tokyo (JP)

(72) Inventors: Yuki Matsumura, Tokyo (JP); Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 37 days.

(21) Appl. No.: 17/043,379

(22) PCT Filed: Mar. 30, 2018

(86) PCT No.: PCT/JP2018/013967
§ 371 (c)(1),
(2) Date: Sep. 29, 2020

(87) PCT Pub. No.: WO2019/187149
PCT Pub. Date: Oct. 3, 2019

(65) Prior Publication Data
US 2021/0028907 A1    Jan. 28, 2021

(51) Int. Cl.
*H04L 5/00*    (2006.01)
*H04W 72/04*   (2009.01)

(52) U.S. Cl.
CPC .......... *H04L 5/0053* (2013.01); *H04L 5/0012* (2013.01)

(58) Field of Classification Search
CPC ............... H04L 5/0012; H04W 48/12; H04W 72/0406; H04W 72/0453
See application file for complete search history.

(56) References Cited

U.S. PATENT DOCUMENTS

| | | | |
|---|---|---|---|
| 11,139,937 B2* | 10/2021 | Kim | H04L 5/0051 |
| 2014/0003375 A1 | 1/2014 | Nam et al. | |
| 2017/0238263 A1 | 8/2017 | Lee et al. | |
| 2018/0288746 A1* | 10/2018 | Zhang | H04L 5/0048 |
| 2019/0261317 A1* | 8/2019 | Nammi | H04W 72/085 |
| 2019/0313438 A1* | 10/2019 | Zhang | H04L 5/0044 |
| 2020/0358587 A1* | 11/2020 | Wang | H04L 5/0042 |

(Continued)

OTHER PUBLICATIONS

3GPP TS 36.300 V8.12.0 "3rd Generation Partnership Project; Technical Specification Group Radio Access Network Evolved Universal Terrestrial Radio Access (E-UTRA) and Evolved Universal Terrestrial Radio Access Network (E-UTRAN); Overall description; Stage 2 (Release 8)" Mar. 2010 (149 pages).

(Continued)

*Primary Examiner* — Diane L Lo
*Assistant Examiner* — Abusayeed M Haque
(74) *Attorney, Agent, or Firm* — Osha Bergman Watanabe & Burton LLP

(57) ABSTRACT

A terminal is disclosed including a receiver that receives system information, the system information including an index value that indicates a first offset value; and a processor that determines a frequency resource for an uplink control channel using frequency-hopping, based on the first offset value and a second offset value, the second offset value being based on at least one of a field value in a downlink control information and an index value of a control channel element. In other aspects, a base station and a radio communication method are also disclosed.

5 Claims, 16 Drawing Sheets

(56) References Cited

U.S. PATENT DOCUMENTS

2021/0028907 A1* 1/2021 Matsumura .......... H04L 5/0053

OTHER PUBLICATIONS

3GPP TSG RAN WG1 Meeting #92; R1-1801695 "PUCCH resource allocation prior to RRC configuration" NEC; Athens, Greece; Feb. 26-Mar. 2, 2018 (5 pages).
E3GPP TSG RAN WG1 Meeting #92; R1-1803428 "Summary of offline discussion on PUCCH resource allocation" OPPO; Athens, Greece; Feb. 26-Mar. 2, 2018 (11 pages).
International Search Report issued in International Application No. PCT/JP2018/013967, dated Jun. 12, 2018 (3 pages).
Written Opinion issued in International Application No. PCT/JP2018/013967; dated Jun. 12, 2018 (4 pages).
Office Action issued in Russian Application No. 2020134401/07; dated Aug. 13, 2021 (10 pages).
Extended European Search Report issued in Application No. 18912899.4 dated Oct. 21, 2021 (8 pages).
OPPO, "Summary of RAN1#92 Tdocs on PUCCH resource allocation" 3GPP TSG RAN WG1 Meeting #92, R1-1803237, Athens, Greece, Feb. 26-Mar. 2, 2018 (9 pages).
Office Action issued in Chilean Application No. 202002518 dated Dec. 15, 2021 (22 pages).
3GPP TSG RAN WG1 Meeting #92; R1-1801734 "PUCCH resource allocation" CATT; Athens, Greece; Feb. 26-Mar. 2, 2018 (7 pages).
Office Action issued in Japanese Application No. 2020-508913; dated Mar. 29, 2022 (4 pages).

\* cited by examiner

| INDEX i IN RMSI | PUCCH PERIOD | CELL-SPECIFIC PRB OFFSET |
|---|---|---|
| 0 | 2 SYMBOLS | 0 |
| 1 | 2 SYMBOLS | 1 |
| 2 | 2 SYMBOLS | 2 |
| 3 | 2 SYMBOLS | 3 |
| 4 | 4 SYMBOLS | 0 |
| 5 | 4 SYMBOLS | 1 |
| 6 | 4 SYMBOLS | 2 |
| 7 | 4 SYMBOLS | 3 |
| 8 | 10 SYMBOLS | 0 |
| 9 | 10 SYMBOLS | 1 |
| 10 | 10 SYMBOLS | 2 |
| 11 | 10 SYMBOLS | 3 |
| 12 | 14 SYMBOLS | 0 |
| 13 | 14 SYMBOLS | 1 |
| 14 | 14 SYMBOLS | 2 |
| 15 | 14 SYMBOLS | 3 |

| ARI | HOPPING DIRECTION | UE-SPECIFIC PRB OFFSET | INITIAL CS INDEX | |
|---|---|---|---|---|
| | | | r=0 | r=1 |
| 000 | 1 | 0 | 0 | 3 |
| 001 | 1 | 1 | 0 | 3 |
| 010 | 1 | 2 | 0 | 3 |
| 011 | 1 | 3 | 0 | 3 |
| 100 | 2 | 0 | 0 | 3 |
| 101 | 2 | 1 | 0 | 3 |
| 110 | 2 | 2 | 0 | 3 |
| 111 | 2 | 3 | 0 | 3 |

FIG. 2B

| ARI | HOPPING DIRECTION | UE-SPECIFIC PRB OFFSET | INITIAL CS INDEX | |
|---|---|---|---|---|
| | | | r=0 | r=1 |
| 000 | 1 | 0 | 0 | 3 |
| 001 | 1 | 0 | 6 | 9 |
| 010 | 1 | 1 | 0 | 3 |
| 011 | 1 | 1 | 6 | 9 |
| 100 | 2 | 0 | 0 | 3 |
| 101 | 2 | 0 | 6 | 9 |
| 110 | 2 | 1 | 0 | 3 |
| 111 | 2 | 1 | 6 | 9 |

| RMSI INDEX | PUCCH PERIOD | CELL-SPECIFIC PRB OFFSET |
|---|---|---|
| 0 | 2 SYMBOLS | 0 |
| 1 | 2 SYMBOLS | floor((Initial_BWP/2) * (1/4)) |
| 2 | 2 SYMBOLS | floor((Initial_BWP/2) * (2/4)) |
| 3 | 2 SYMBOLS | floor((Initial_BWP/2) * (3/4)) |
| 4 | 4 SYMBOLS | 0 |
| 5 | 4 SYMBOLS | floor((Initial_BWP/2) * (1/4)) |
| 6 | 4 SYMBOLS | floor((Initial_BWP/2) * (2/4)) |
| 7 | 4 SYMBOLS | floor((Initial_BWP/2) * (3/4)) |
| 8 | 10 SYMBOLS | 0 |
| 9 | 10 SYMBOLS | floor((Initial_BWP/2) * (1/4)) |
| 10 | 10 SYMBOLS | floor((Initial_BWP/2) * (2/4)) |
| 11 | 10 SYMBOLS | floor((Initial_BWP/2) * (3/4)) |
| 12 | 14 SYMBOLS | 0 |
| 13 | 14 SYMBOLS | floor((Initial_BWP/2) * (1/4)) |
| 14 | 14 SYMBOLS | floor((Initial_BWP/2) * (2/4)) |
| 15 | 14 SYMBOLS | floor((Initial_BWP/2) * (3/4)) |

FIG. 3

| RMSI INDEX | PUCCH PERIOD | CELL-SPECIFIC PRB OFFSET |
|---|---|---|
| 0 | 2 SYMBOLS | 0 |
| 1 | 2 SYMBOLS | floor((Initial_BWP/2)*(1/2)) |
| 2 | 4 SYMBOLS | 0 |
| 3 | 4 SYMBOLS | floor((Initial_BWP/2)*(1/2)) |
| 4 | 10 SYMBOLS | 0 |
| 5 | 10 SYMBOLS | floor((Initial_BWP/2)*(1/2)) |
| 6 | 14 SYMBOLS | 0 |
| 7 | 14 SYMBOLS | floor((Initial_BWP/2)*(1/2)) |

FIG. 8

| INDEX i IN RMSI | PUCCH PERIOD | CELL-SPECIFIC PRB OFFSET |
|---|---|---|
| 0 | 2 SYMBOLS | 0 |
| 1 | | floor((Initial_BWP/2)*(1/2)) |
| 2 | 4 SYMBOLS | 0 |
| 3 | | floor((Initial_BWP/2)*(1/2)) |
| 4 | 10 SYMBOLS | 0 |
| 5 | | floor((Initial_BWP/2)*(1/4)) |
| 6 | | floor((Initial_BWP/2)*(2/4)) |
| 7 | | floor((Initial_BWP/2)*(3/4)) |
| 8 | 14 SYMBOLS | 0 |
| 9 | | floor((Initial_BWP/2)*(1/4)) |
| 10 | | floor((Initial_BWP/2)*(2/4)) |
| 11 | | floor((Initial_BWP/2)*(3/4)) |

FIG. 9

| ARI | HOPPING DIRECTION | UE-SPECIFIC PRB OFFSET | INITIAL CS INDEX | |
| --- | --- | --- | --- | --- |
| | | | r=0 | r=1 |
| 000 | 1 | 0 | 0 | 3 |
| 001 | 1 | 1 | 0 | 3 |
| 010 | 1 | 2 | 0 | 3 |
| 011 | 1 | 3 | 0 | 3 |
| 100 | 2 | 0 | 0 | 3 |
| 101 | 2 | 1 | 0 | 3 |
| 110 | 2 | 2 | 0 | 3 |
| 111 | 2 | 3 | 0 | 3 |

FIG. 10

TERMINAL, BASE STATION, AND RADIO COMMUNICATION METHOD

TECHNICAL FIELD

The present invention relates to a user terminal and a radio base station in next-generation mobile communication systems.

BACKGROUND ART

In the UMTS (Universal Mobile Telecommunications System) network, the specifications of long-term evolution (LTE) have been drafted for the purpose of further increasing high speed data rates, providing lower latency and so on (see non-patent literature 1). In addition, successor systems of LTE are also under study for the purpose of achieving further broadbandization and increased speed beyond LTE (referred to as, for example, "LTE-A (LTE-Advanced)," "FRA (Future Radio Access)," "4G," "5G," "5G+ (plus)," "NR (New RAT)," "LTE Rel. 15 (or later versions)," and/or the like).

In existing systems (for example, LTE Rel. 8 to 13), downlink (DL) and/or uplink (UL) communication are performed using 1-ms subframes (also referred to as "transmission time intervals (TTIs)" and so on). This subframe is the unit of time it takes to transmit one channel-encoded data packet, and is the processing unit in, for example, scheduling, link adaptation, retransmission control (HARQ (Hybrid Automatic Repeat reQuest)) and so on.

Also, in existing LTE systems (for example, LTE Rel. 8 to 13), a user terminal transmits uplink control information (UCI) by using an uplink control channel (for example, PUCCH (Physical Uplink Control CHannel)) or an uplink shared channel (for example, PUSCH (Physical Uplink Shared CHannel)). The format of this UL control channel is referred to as "PUCCH format" and so on.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall Description; Stage 2 (Release 8)," April, 2010

SUMMARY OF INVENTION

Technical Problem

For future radio communication systems (for example, LTE Rel. 15 or later versions, 5G, 5G+, NR, etc.), a method of allocating uplink control channel resources (for example, PUCCH resources) for use for transmitting UCI, to user terminals, is under study.

For example, research is in progress on allowing a user terminal to determine PUCCH resources for use for transmitting UCI, before an RRC (Radio Resource Control) connection is set up, based on at least one of a given field value in system information (for example, RMSI (Remaining Minimum System Information)), a given field value in downlink control information (DCI) and an implied value.

However, with this PUCCH resource determination method, it is more likely that frequency resource for PUCCH, using frequency-hopping within a given bandwidth, cannot be determined appropriately.

The present invention has been made in view of the above, and it is therefore an object of the present invention to provide a user terminal and a radio base station, whereby the frequency resource for PUCCH, using frequency-hopping within a given bandwidth, can be determined appropriately.

Solution to Problem

According to an example of the present invention, a user terminal has a receiving section that receives system information including an index value that indicates a first offset value, which is a value based on a given bandwidth, or 0, and a control section that determines a frequency resource for an uplink control channel, using frequency-hopping within the given bandwidth, based on the first offset value.

Advantageous Effects of Invention

According to the present invention, it is possible to appropriately determine the frequency resource for PUCCH, using frequency-hopping within a given bandwidth.

BRIEF DESCRIPTION OF DRAWINGS

FIG. 1 is a diagram to show examples of PUCCH resources that are designated by RMSI index values;

FIGS. 2A and 2B are diagrams to show examples of PUCCH resources that are designated by ARIs per PUCCH format;

FIG. 3 is a diagram to show examples of RMSI indices that designate four-valued cell-specific PRB offsets, according to a first example of the present invention;

FIG. 8 is a diagram to show examples of RMSI indices that designate two-valued cell-specific PRB offsets, according to the first example;

FIG. 9 is a diagram to show examples of RMSI indices that designate two-valued and four-valued cell-specific PRB offsets, according to the first example;

FIG. 10 is a diagram to show examples of PUCCH resources that are designated by ARIs and that are common between PUCCH formats;

DESCRIPTION OF EMBODIMENTS

Figure 4A:
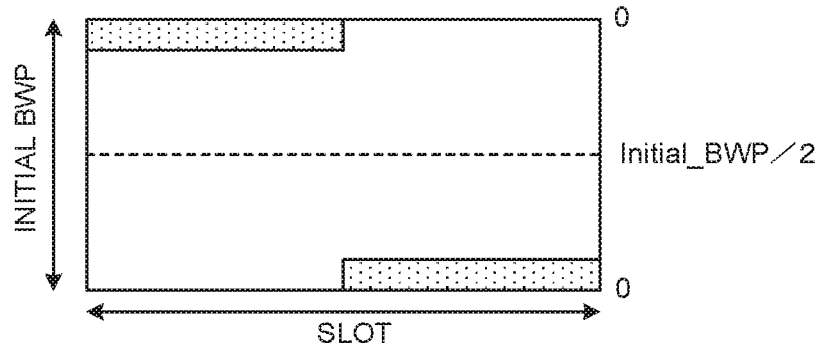
FIGS. 4A to 4D are diagrams to show examples of frequency-hopping using four-valued cell-specific PRB offsets, according to the first example.

Envisaging future radio communication systems (for example, LTE Rel. 15 or later versions, 5G, NR, etc.), formats for an uplink control channel (for example, PUCCH) that is used to transmit UCI are under study (these formats may be referred to simply as "formats," or may be referred to as "PUCCH formats (PFs), and/or the like). For example, studies are underway to support five kinds of PFs, namely PF 0 to PF 4, in LTE Rel. 15. Note that the names of PFs shown below are only examples, and different names may be used.

For example, PF 0 and PF 1 are PFs that are for use for transmitting up to two bits of UCI (for example, delivery acknowledgment information (also referred to as "HARQ-ACK (Hybrid Automatic Repeat reQuest-ACKnowledgment)," "ACK," "NACK" and so forth)). PF 0 can be allocated to one or two symbols, and therefore is also referred to as "short PUCCH," "sequence-based short PUCCH," and the like. Meanwhile, PF 1 can also allocated to four to fourteen symbols, and therefore is referred to as "long PUCCH" and/or the like. When PF 1 is used, multiple user terminals may be code-division-multiplexed (CDM), by time-domain block spreading using at least one of CS and OCC, in the same physical resource block (also referred to as "PRB," "resource block (RB)," and so forth).

PF 2 to PF 4 are PFs for use for transmitting more than two bits of UCI (for example, channel state information (CSI), or CSI and HARQ-ACK and/or scheduling request (SR)). PF 2 can be allocated to one or two symbols, and therefore is referred to as "short PUCCH," and/or the like. Meanwhile, PF 3 and PF 4 can be allocated to four to fourteen symbols, and therefore are referred to as "long PUCCH" and the like. When PF 3 is used, multiple user terminals may be code-division-multiplexed (CDM) by using (frequency domain) block spreading before DFT.

Now, resources for use for transmitting uplink control channels having the formats described above (for example, PUCCH resources) are under study so as to find out how to determine PUCCH resources for use for transmitting UCI, before an RRC connection is set up, based on at least one of a given field value in system information (for example, RMSI (Remaining Minimum System Information)), a given field value in downlink control information (DCI) and an implied value.

For example, before an RRC connection is set up, a given field value in RMSI (also referred to as "index value," "RMSI index value," "given value," "indicator (indication)," "RMSI indicator," and so forth) may designate one of a number of PUCCH resources. For example, sixteen kinds of PUCCH resources may be designated by four-bit RMSI index values.

Each PUCCH resource that is designed by an RMSI index value may include one or more cell-specific parameters. These cell-specific parameters may include, for example, at least one of the following parameters, or other parameters:

Information to show what period is allocated to PUCCH (the number of symbols, the PUCCH period, etc.), which is, for example, information to show one of 2, 4, 10, and 14 symbols;

Information to show offsets (PRB offsets, frequency offsets, cell-specific PRB offsets, etc.) that are used to determine the frequency resources to allocate to PUCCH when frequency-hopping is used; and The starting symbol of PUCCH.

In addition, one of multiple PUCCH resources is designated by at least one of a given field value in DCI (a PUCCH resource indicator, an ACK/NACK resource indicator (ARI (ACK/NACK Resource Indicator)), an ACK/NACK resource offset (ARO (ACK/NACK Resource Offset) or a TPC command field value) and an implied value. For example, sixteen kinds of PUCCH resources are designed by three-bit ARIs in DCI and one-bit implied values.

Each PUCCH resource that is designed by at least one of an ARI and an implied value may include one or more UE-specific parameters. For example, these UE-specific parameters may include at least one of the following parameters, or other parameters:

Information to show the direction of hopping in a given bandwidth (hopping direction), examples including information (for example, "1") that associates the first hop with a PRB with a small index number and a second hop with a PRB with a large index number, or information (for example, "2") that associates the first hop with a PRB with a large index number and a second hop with a PRB with a small index number, and so forth;

Information to show offsets (PRB offset, frequency offset, cell-specific PRB offset, etc.) that are used to determine the frequency resource to allocate to PUCCH when frequency-hopping is used; and Information to show the index of the initial cyclic shift (CS).

Also, the above implied value may be derived from at least one of the following parameters, for example. Note that the implied value may be any value as long as it is derived without explicit signaling:

The index of a control resource unit (for example, CCE (Control Channel Element)) to which a downlink control channel (for example, PDCCH (Physical Downlink Control Channel)) is allocated; and The aggregation level of these control resource units.

FIG. 1 is a diagram to show examples of PUCCH resources that are designated by RMSI index values. For example, as shown in FIG. 1, each four-bit RMSI index value may specify a PUCCH period and a cell-specific PRB offset.

FIGS. 2A and 2B are diagrams to show examples of PUCCH resources designated by ARIs. FIG. 2A shows examples of PUCCH resources for PUCCH format 0, and FIG. 2B shows examples of PUCCH resources for PUCCH format 1.

For example, as shown in FIGS. 2A and 2B, a three-bit ARI may show the direction of hopping, a UE-specific PRB offset and multiple initial CS indices. For example, a user terminal may derive a one-bit value, or "r (implied value)," based on a CCE index, and determine one of the multiple of initial indices based on this value r.

As described above, when, in future radio communication systems, frequency-hopping is applied to PUCCH, the frequency resource to allocated to the PUCCH may be PRBs that are a given offset value x apart from the PRB at each edge of a given bandwidth (for example, a bandwidth part (BWP)).

Here, a BWP refers to a partial band that is configured in a carrier, and is also referred to as a "partial band" and so on. A BWP may be a BWP for uplink (UL) (UL BWP, Uplink BWP, etc.), and/or a BWP for downlink (DL) (DL BWP, Downlink BWP, etc.). The uplink BWP for random access (initial access) may be referred to as "initial BWP," "initial uplink BWP," "initial access BWP," and the like.

Also, the downlink BWP that is used to detect blocks containing synchronization signals and a broadcast channel (also referred to as "SSB (Synchronization Signal Block)" or "SS/PBCH Block (Synchronization Signal/Physical Broadcast Channel Block)") may be referred to as "initial downlink BWP" and the like.

Also, when one or more BWPs (at least one or more uplink BWPs or one or more downlink BWPs) are configured in a user terminal, at least one BWP may be activated. A BWP in the active state may also be referred to as an "active BWP" (which may be an active uplink BWP or an active downlink BWP), and so on. Also, a default BWP a fault uplink BWP or a default downlink P) may be configured in the user terminal.

For example, the frequency resource for the first hop may be configured by a given number of PRBs that are a given offset value x apart from one edge of a given bandwidth (for example, an initial access BWP), and the frequency resource for a second hop may be configured by a given number of PRBs that are the given offset value x apart from the other edge of the given bandwidth.

Also, the given offset value x is derived based on at least one of a cell-specific PRB offset, which is designed by the RMSI index value, and a UE-specific PRB offset, which is designed by an ARI. For example, the given offset value x may be: cell-specific PRB offset+UE-specific PRB offset.

However, as shown in FIG. 1, if the cell-specific PRB offset which the RMSI index value designates is a fixed value (for example, one of 0 to 3 in FIG. 1), PUCCHs may be allocated to concentrate in areas around both edges of a given bandwidth (for example, an initial access BWP), and there is a possibility that the frequency resource for PUCCH, using frequency-hopping in this given bandwidth, cannot be allocated appropriately.

So the present inventors have come up with an idea that it may be possible to determine, appropriately, the frequency resource for PUCCH, using frequency-hopping within a given bandwidth, by setting cell-specific PRB offset values to values based on this given bandwidth (which may be, for example, an initial access BWP), instead of fixed values.

Now, embodiments of the present invention will be described below in detail.

In the following description of embodiments, a user terminal receives system information, containing an index value that indicates a cell-specific PRB offset (first offset value), which is a value based on a given bandwidth, or 0. Based on this cell-specific PRB offset, the user terminal determines the frequency resource for PUCCH, using frequency-hopping within this given bandwidth.

An initial access BWP will serve as the given bandwidth in the following description, but the present invention is by no means limited to this, and other uplink BWPs or downlink BWPs may be used as well.

Also, RMSI will serve as the system information to contain index values that indicate cell-specific PRB offset values in the following description, but any information may be used, as long as the information is broadcast in given units (for example, cell units, component carrier units, carrier units, and so forth). Also, in the description below, the index value that is provided in RMSI and that indicates a cell-specific PRB offset will be also referred to as the "RMSI index value".

First Example

With the first example of the present invention, cell-specific PRB offsets, which are designed by RMSI index values, will be described below. The cell-specific PRB offsets may have either four values or two values, both including at least one of a value that is based on an initial access BWP, and 0.

<4-Valued Cell-Specific PRB Offsets>

FIG. 3 is a diagram to show examples of RMSI index values that designate 4-valued cell-specific PRB offsets, according to the first example. As shown in FIG. 3, 4-valued cell-specific PRB offsets may be associated with respective PUCCH periods, and these 4-valued cell-specific PRB offsets may be designated by four different RMSI indices. For example, in FIG. 3, 4-valued cell-specific PRB offset are associated with four PUCCH periods of 2, 4, 10 and 14 symbols. respectively.

Also, FIG. 3 shows the four values {0, floor((Initial_BWP/2)*(1/4)), floor((Initial_BWP/2)*(2/4)), floor((Initial_BWP/2)*(3/4))} as cell-specific PRB offsets. Here, "Initial_BWP" may be the number of PRBs constituting the initial access BWP.

FIGS. 4A to 4D are diagrams to show examples of frequency-hopping using 4-valued cell-specific PRB offsets, according to the first example. FIGS. 4A, 4B, 4D and 4C show examples of frequency-hopping, assuming cases in which, as shown in FIG. 3, the RMSI index value is 12, 13, 14 and 15 (that is, cases where the PUCCH period is fourteen symbols), respectively. Note that the examples of frequency-hopping described below with reference to the accompanying drawings are by no means limiting. For example, the PUCCH period may be comprised of part of the symbols constituting the slot (for example, two, four or ten symbols).

Assume that, in FIGS. 4A to 4D, the UE-specific PRB offset that is designated by the ARI in DCI is 0, or that this UE-specific PRB offset is not used. Also, although FIGS. 4A to 4D assume cases where the initial access BWP is comprised of an even number of PRBs, this is by no means limiting. The initial access BWP may be comprised of an odd number of PRBs, and the patterns of frequency-hopping are not limited to those shown in the drawings.

As shown in FIG. 4A, when the cell-specific PRB offset designated by the RMSI index value is "0," a user terminal may determine a given number of PRBs at both edges of the initial access BWP as frequency resources for PUCCH, using frequency-hopping within the initial access BWP. To be more specific, a given number of PRBs (for example, one PRB) at both edges of the initial access BWP may be determined as frequency resources for the first and second hops.

Figure 4B:
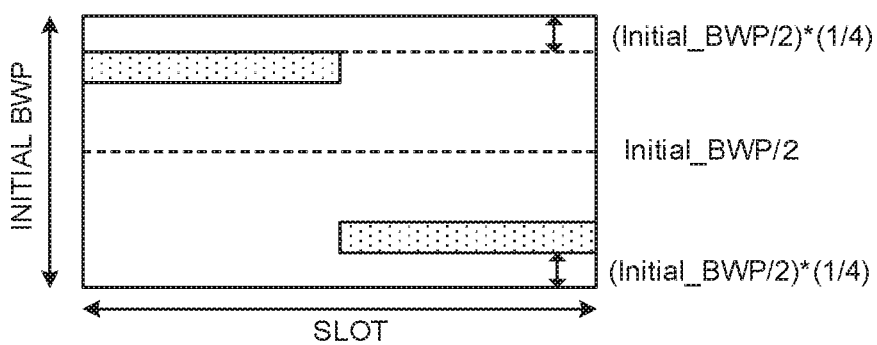

Also, as shown in FIG. 4B, when the cell-specific PRB offset which the RMSI index value designates is "floor ((Initial_BWP/2)*(1/4))," the user terminal may determine a given number of PRBs that are (floor((Initial_BWP/2)*(1/4)) apart from both edges of the initial access BWP as frequency resources for PUCCH using frequency-hopping within the initial access BWP. To be more specific, a given number of PRBs (for example, one PRB) that are floor ((Initial_BWP/2)*(1/4)) apart from both edges of the initial access BWP may be determined as frequency resources for the first and second hops.

Figure 4C:
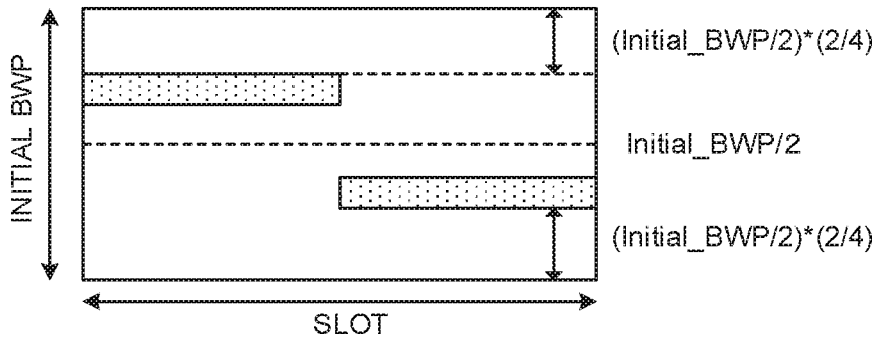
Figure 4D:
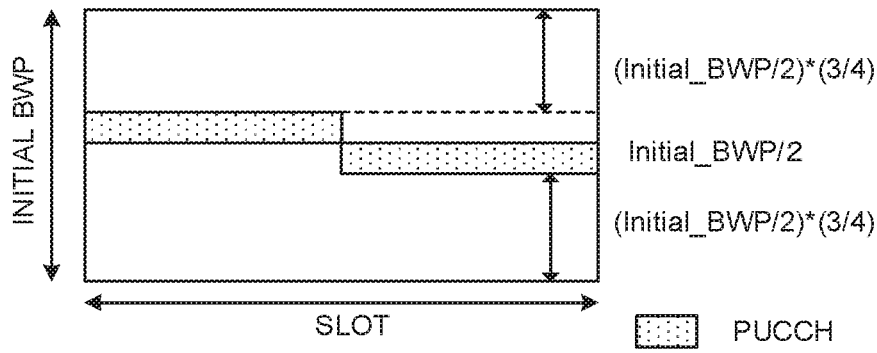
Figure 5A:
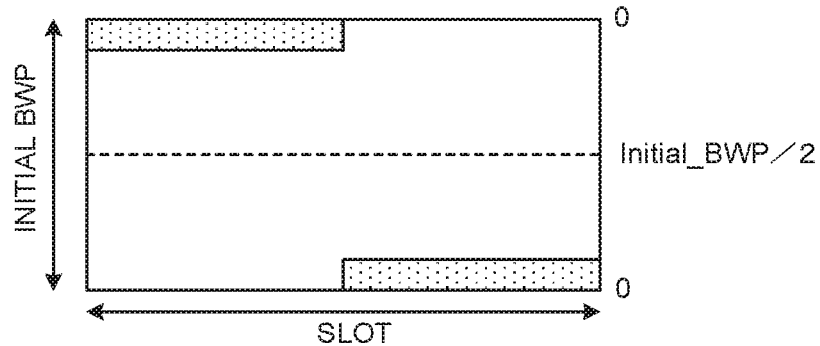
FIGS. 5A to 5D are diagrams to show examples of frequency-hopping using four-valued cell-specific PRB offsets, according to the first example.
Figure 5B:
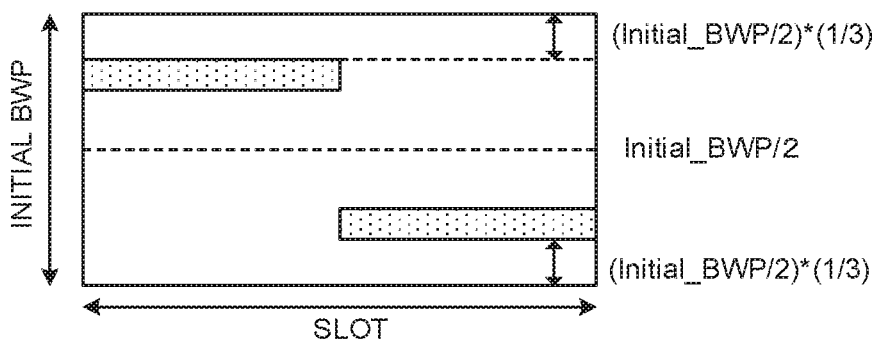
Figure 5C:
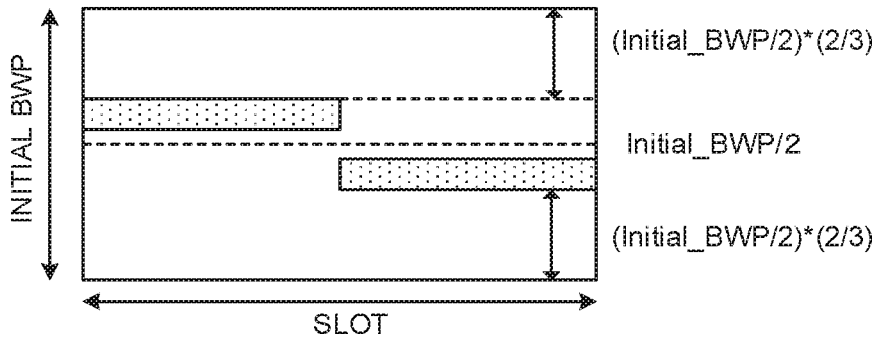
Figure 5D:
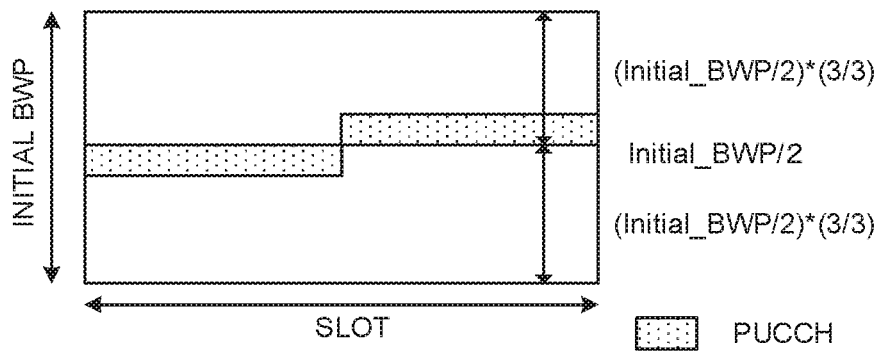

Similarly, in FIGS. 4C and 4D, the user terminal may determine a given number of PRBs that are apart from both edges of the initial access BWP by cell-specific PRB offsets that are designated by RMSI index values, namely "floor ((Initial_BWP/2)*(2/4))" and "floor((Initial_BWP/2)*(3/4))," as frequency resources for PUCCH, using frequency-hopping within the initial access BWP.

In this way, each cell-specific PRB offset value may divide the bandwidth of the initial access BWP from each edge to the center (or to the central PRB) evenly, and determine a proportion to the bandwidth as the whole. That is, each cell-specific PRB offset value may multiply the bandwidth by a given coefficient α(α≤0). For example, in FIGS. 4A to 4D, the initial access BWP, from each edge to the center, is divided into four equal portions, but this is by no means limiting. For example, the initial access BWP, from each edge to the center, may be divided into three equal portions, as shown in FIGS. 5A to 5D.

FIGS. 5A to 5D are diagrams to show other examples of frequency-hopping using 4-valued cell-specific PRB offsets, according to the first example. FIGS. 5A to 5D are different from FIGS. 4A to 4D in that the initial access BWP, from each edge to the center, is divided into three equal portions. With reference to FIGS. 5A to 5D, now, the differences from FIGS. 4A to 4D will be primarily described.

In FIGS. 5A to 5D, four values {0, floor((Initial_BWP/2)*(1/3)), floor((Initial_BWP/2)*(2/3)), floor((Initial_BWP/2)*(3/3)) may be used as cell-specific PRB offsets. In this case, the four values designated by RMSI index values in FIG. 3 are also replaced with {0, floor((Initial_BWP/2)*(1/3)), floor((Initial_BWP/2)*(2/3)), floor((Initial_BWP/2)*(3/3))}.

As shown in FIGS. 4A to 4D and FIGS. 5A to 5D, each cell-specific PRB offset value may divide the bandwidth of the initial access BWP from each edge to the center (or to the central PRB) evenly, and represents a proportion to the bandwidth as the whole, so that PUCCH resources, using frequency-hopping, can be spread throughout the initial access BWP.

<2-Valued Cell-Specific PRB Offsets>

Figure 6A:
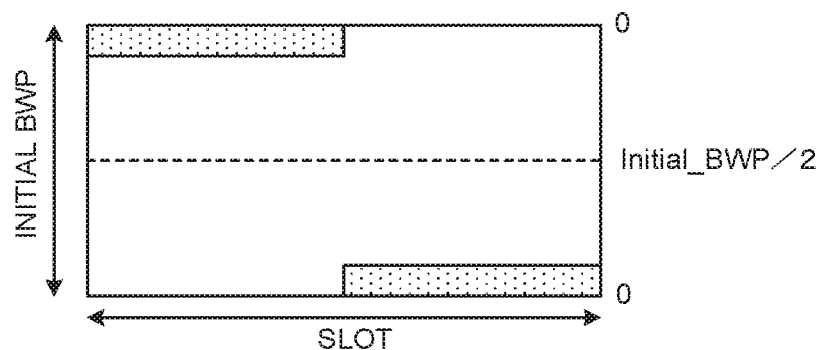
FIGS. 6A and 6B are diagrams to show examples of frequency-hopping using two-valued cell-specific PRB offsets, according to the first example.
Figure 6B:
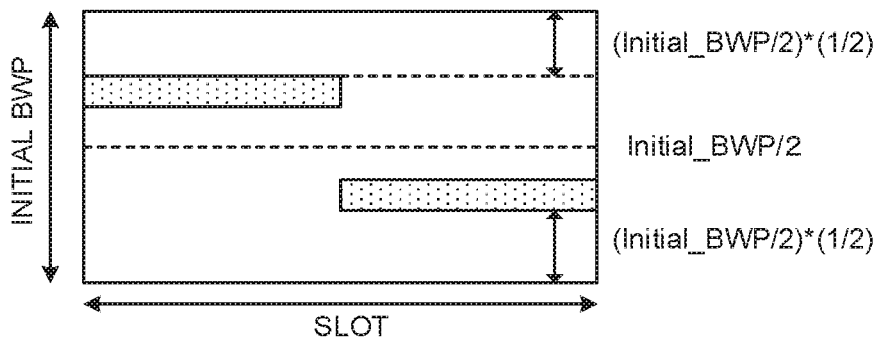

FIGS. 6A and 6B are diagrams to show examples of frequency hopping using 2-valued cell-specific PRB offsets, according to the first example. As shown in FIGS. 6A and 6B, when 2-valued cell-specific PRB offsets are used, the initial access BWP, from each edge to the center, may be divided into two equal portions.

In the cases illustrated in FIGS. 6A and 6B, two values {0, floor((Initial_BWP/2)*(1/2))} may be used as cell-specific PRB offsets.

Figure 7A:
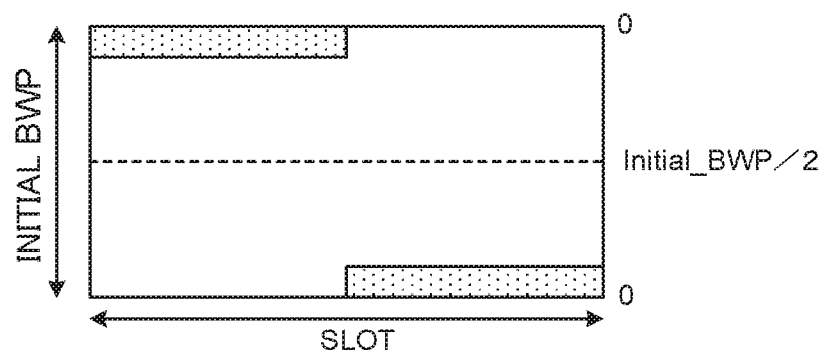
FIGS. 7A and 7B are diagrams to show other examples of frequency-hopping using two-valued cell-specific PRB offsets, according to the first example.
Figure 7B:
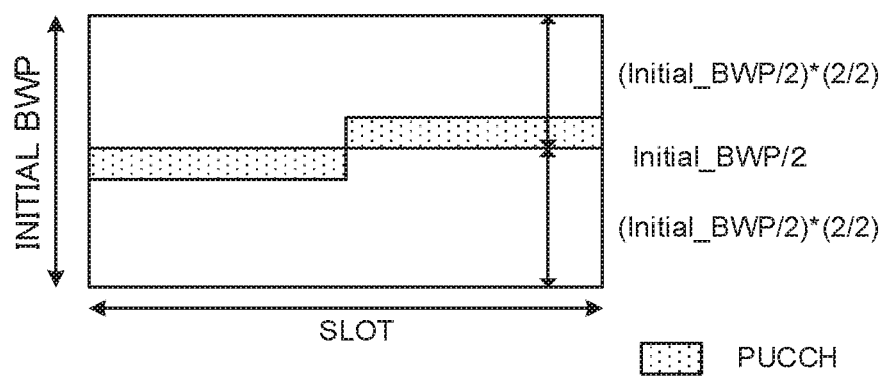

FIGS. 7A and 7B are diagrams to show other examples of frequency-hopping using 2-valued cell-specific PRB offsets, according to the first example. FIGS. 7A and 7B are different from FIGS. 6A and 6B in that two values {0, floor((Initial_BWP/2)*(2/2))} are used as cell-specific PRB offsets.

FIG. 8 is a diagram to show examples of RMSI index values that designate 2-valued cell-specific PRB offsets, according to the first example. As shown in FIG. 8, 2-valued cell-specific PRB offsets may be associated with respective PUCCH periods, and these 2-valued cell-specific PRB offsets may be designated by two different RMSI indices. For example, in FIG. 8, 2-valued cell-specific PRB offset are associated with four PUCCH periods of 2, 4, 10 and 14 symbols, respectively.

<Selection of Four Values or Two Values>

Whether the cell-specific PRB offsets have the above two values or four values (1) may be set forth in the specification, (2) may be determined based on the PUCCH period, or (3) may be determined based on the initial access BWP.

For example, (1) when this is set forth in the specification, as shown in FIG. 3, a table to define RMSI indices that indicate 4-valued cell-specific PRB offsets per PUCCH period may be provided. Alternatively, as shown in FIG. 8, a table to define RMSI indices that indicate 2-valued cell-specific PRB offsets per PUCCH period may be provided. Alternatively, as shown in FIG. 9, a table to define RMSI indices that indicate 4-valued cell PRB offsets or 2-valued cell PRB offsets depending on PUCCH periods may be provided.

Alternatively, (2) the user terminal may determine whether to use 4-valued cell-specific PRB offsets or 2-valued cell-specific PRB offsets based on what PUCCH period is used for UCI transmission. For example, the user terminal may determine whether to use the table of FIG. 3 or the table of FIG. 8, based on the PUCCH period.

Alternatively, (3) the user terminal may determine whether to use 4-valued cell-specific PRB offsets or 2-valued cell-specific PRB offsets based on the number of PRBs constituting the initial access BWP that is used to transmit UCI. For example, the user terminal may determine whether to use the table of FIG. 3 or the table of FIG. 8, based on the number of PRBs constituting the initial PRB.

According to the first example, frequency resources for PUCCH, using frequency-hopping within an initial access BWP, are determined by using cell-specific PRB offsets based on the initial access BWP. Consequently, unlike the case where these cell-specific PRB offsets are fixed values, PUCCH frequency resource can be allocated flexibly.

Second Example

Now, with a second example of the present invention, how ARIs designate initial CS indices will be described below.

In FIGS. 2A and 2B, which ARIs indicate which PUCCH resources is determined by using different tables for every PUCCH format. For example, two CSs (amounts of CS) are used in PF 0, while one CS (amount of CS) is used in PF 1.

Therefore, when the initial CS index "0" is designated in the table for PF 0 shown in FIG. 2A, UCI is transmitted by using the CS with the CS index {0, 6}. Also, when the initial CS index "3" is designated, UCI is transmitted by using the CS with the CS index {3, 9}.

Meanwhile, when the initial CS index "0" is designated in the table for PF 1 shown in FIG. 2B, UCI is transmitted by using the CS with the CS index {0}. Likewise, when the initial CS indices "3," "6" and "9" are designated, UCI is transmitted by using the CSs with the CS indices {3}, {6} and {9}, respectively.

On the other hand, it may be possible to determine which ARIs indicate which PUCCH resources by using a table that is shared between multiple PUCCH formats.

FIG. 10 is a diagram to show examples of PUCCH resources designed by ARIs, according to the second example. The table of FIG. 10, which applies to PF 0 and PF 1 in common, shows which ARIs indicate which PUCCH resources.

Assuming that PF 0 is used, if the initial CS index "0" is designated in the table shown in FIG. 10, UCI is transmitted by using the CS with the CS index {0, 6}. Also, when the initial CS index "1" is designated, UCI is transmitted by using the CS with the CS index {3, 9}.

On the other hand, assuming the case PF 1 is used, if the initial CS index "0" is designated in the table shown in FIG. 10, UCI is transmitted by using the CS with the CS index {0}. Also, when the initial CS index "3" is designated, UCI is transmitted by using the CS with the CS index {3}.

In this way, according to the table shown in FIG. 10, which applies to PF 0 and PF 1 in common, unlike the table for PF 1 shown in FIG. 2B, the CS indices {6} and {9} are not used when PF 1 is used. Note that, CS indices (for example, {6}, {9}) that are not defined in this common table may be available for use as PUCCH resources after an RRC connection is set up.

When the common table shown in FIG. 10 is used, it is possible to communalize the tables for PF 0 and PF 1. Also, although the table shown in FIG. 2B can only apply 2-valued UE-specific PRB offsets to PF 1, the table shown in FIG. 10 can apply 4-valued UE-specific PRB offsets to PF 1, too, in addition to PF 0.

In this way, according to the second example, which PUCCH resources are indicated by which ARIs is determined so as to be shared in common by PF 0 and PF 1, so that increased UE-specific PRB offsets can be applied to PF 1. Consequently, it is possible to determine frequency resources for PUCCH, using frequency-hopping within a given bandwidth, more flexibly than the table shown in FIG. 2B can.

(Radio Communication System)

Now, the structure of a radio communication system according to the present embodiment will be described below. In this radio communication system, the radio communication methods according to the above-described embodiments are employed. Note that the radio communication methods according to the herein-contained examples of the present invention may be applied individually, or at least two or more of them may be combined and applied.

Figure 11:
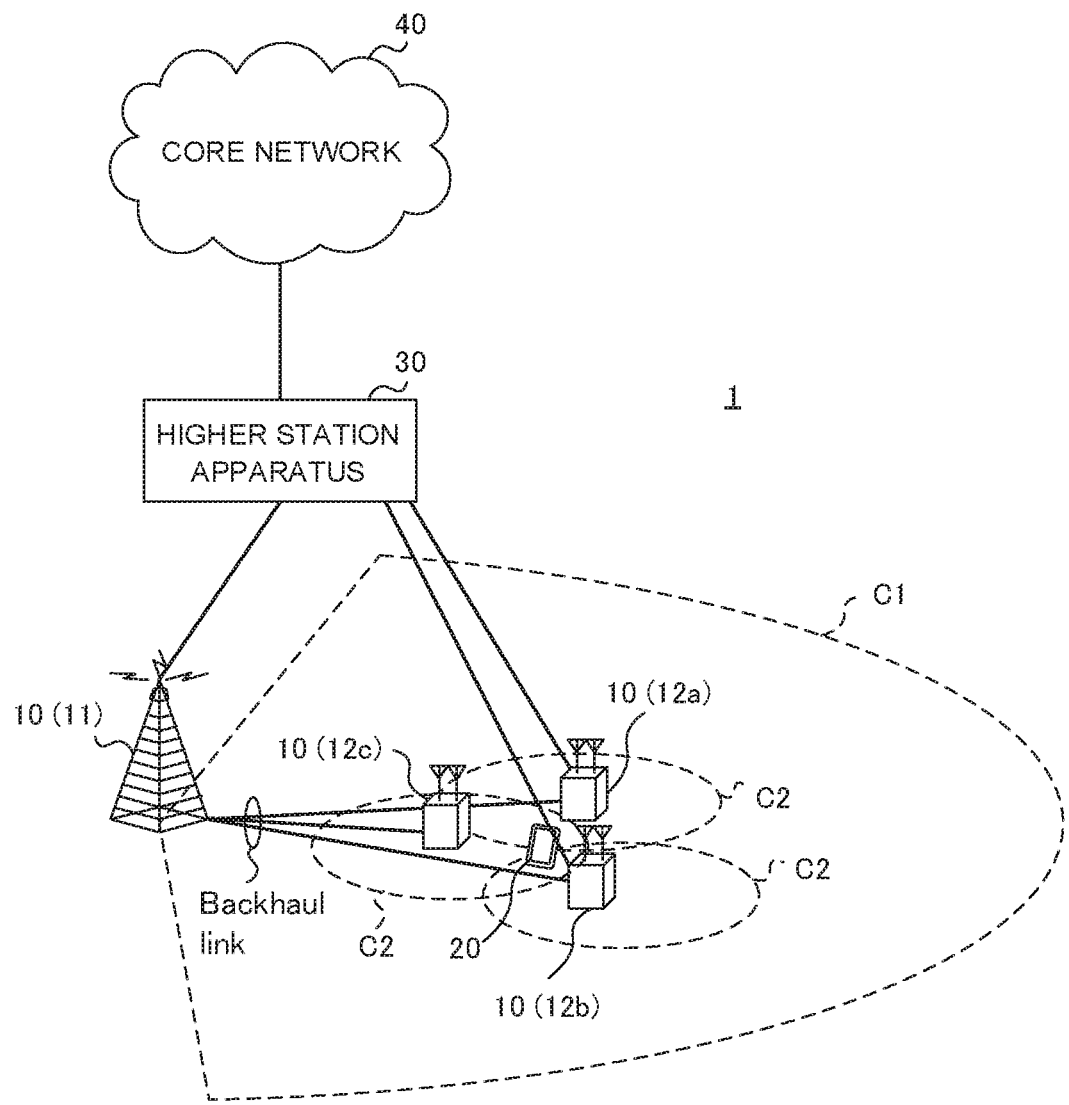
FIG. 11 is a diagram to show an exemplary schematic structure of a radio communication system according to the present embodiment.

FIG. 11 is a diagram to show an exemplary schematic structure of a radio communication system according to the present embodiment. A radio communication system 1 can adopt carrier aggregation (CA) and/or dual connectivity (DC), in which a number of fundamental frequency blocks (component carriers) are grouped as one, using LTE system bandwidth (for example, 20 MHz) as one unit. Note that the radio communication system 1 may be also referred to as "SUPER 3G," "LTE-A (LTE-Advanced)," "IMT-Advanced," "4G," "5G," "FRA (Future Radio Access)," "NR (New RAT (New Radio Access Technology))," and so on.

The radio communication system 1 shown in FIG. 11 includes a radio base station 11 that forms a macro cell C1, and radio base stations 12a to 12c that are placed within the macro cell C1 and that form small cells C2, which are narrower than the macro cell C1. Also, user terminals 20 are placed in the macro cell C1 and in each small cell C2. A structure in which different numerologies are applied between cells and/or within cells may be adopted here.

Here, "numerology" refers to communication parameters in the frequency direction and/or the time direction (for example, at least one of the subcarrier spacing (subcarrier interval), the bandwidth, the duration of symbols, the time length of CPs (CP length), the duration of subframes, the time length of TTIs length), the number of symbols per TTI, the radio frame structure, the filtering process, the windowing process, and so on). The radio communication system 1 may support, for example, the subcarrier spacings of 15 kHz, 30 kHz, 60 kHz, 120 kHz, 240 kHz and so on.

The user terminals 20 can connect with both the radio base station 11 and the radio base stations 12. The user terminals 20 may use the macro cell C1 and the small cells C2, which use different frequencies, at the same time, by means of CA or DC. Also, the user terminals 20 can execute CA or DC by using a plurality of cells (CCs) (for example, two or more CCs). Furthermore, the user terminals can use licensed-band CCs and unlicensed-band CCs as a plurality of cells.

Furthermore, the user terminals 20 can communicate based on time division duplexing (TDD) or frequency division duplexing (MD) in each cell. A TDD cell and an FDD cell may be referred to as a "TDD carrier (frame structure type 2)" and an "FDD carrier (frame structure type 1)," respectively.

Furthermore, in each cell (carrier), a single numerology may be employed, or a plurality of different numerologies may be employed.

Between the user terminals 20 and the radio base station 11, communication can be carried out using a carrier of a relatively low frequency band (for example, 2 GHz) and a narrow bandwidth (referred to as, for example, an "existing carrier," a "legacy carrier," and/or the like). Meanwhile, between the user terminals 20 and the radio base stations 12, a carrier of a relatively high frequency band (for example, 3.5 GHz, 5 GHz, 30 to 70 GHz and so on) and a wide bandwidth may be used, or the same carrier as that used in the radio base station 11 may be used. Note that the structure of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between two radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "gNB (gNodeB)," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "eNBs," "gNBs," "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A, 5G, NR and so on, and may be either mobile communication terminals or stationary communication terminals. Furthermore, the user terminals 20 can perform device-to-device (D2D) communication with other user terminals 20.

In the radio communication system 1, as radio access schemes, OFDMA (orthogonal Frequency Division Multiple Access) can be applied to the downlink (DL), and SC-TDMA (Single-Carrier Frequency Division Multiple Access) can be applied to the uplink (UL). OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are not limited to the combination of these, and OFDMA may be used in the UL.

Also, in the radio communication system 1, a multicarrier waveform (for example, OFDM waveform) may be used, or a single-carrier waveform (for example, DFT-s-OFDM waveform) may be used.

DL channels that are used in the radio communication system 1 include a DL shared channel that is shared by each user terminal 20 (also referred to as "PDSCH (Physical Downlink Shared CHannel)," "DL data channel" and so forth), a broadcast channel (PBCH (Physical Broadcast CHannel)), L1/L2 control channels and so on. User data, higher layer control information, SIBs (System Information Blocks) and so forth are communicated in the PDSCH. Also, the MIB (Master Information Block) is communicated in the PBCH.

The L1/L2 control channels include DL control channels (such as PDCCH (Physical Downlink Control CHannel), EPDCCH (Enhanced Physical Downlink Control CHannel), etc.), PCFICH (Physical Control Format indicator CHannel), PHICH (Physical Hybrid-ARQ Indicator CHannel) and so on. Downlink control information (DCI), including PDSCH and PUSCH scheduling information, is communicated by the PDCCH. The number of OFDM symbols to use for the PDCCH is communicated by the PCFICH. The EPDCCH is frequency-division-multiplexed with the PDSCH and used to communicate DCI and so on, like the PDCCH. HARQ retransmission control information (ACK/NACK) in response to the PUSCH can be communicated using at least one of the PHICH, the PDCCH and the EPDCCH.

UL channels that are used in the radio communication system 1 include a UL shared channel that is shared by each user terminal 20 (also referred to as "PUSCH (Physical Uplink Shared CHannel)," "uplink shared channel" and/or the like), an uplink control channel (PUCCH (Physical Uplink Control CHannel)), a random access channel (PRACH (Physical Random Access CHannel)) and so on. User data, higher layer control information and so on are communicated by the PUSCH. Uplink control information (UCI), which contains at least one of DL signal retransmission control information (A/N), channel state information (CSI) and so on, is communicated in the PUSCH or the PUCCH. By means of the PRACH, random access preambles for establishing connections with cells are communicated.

(Radio Base Station)

Figure 12:
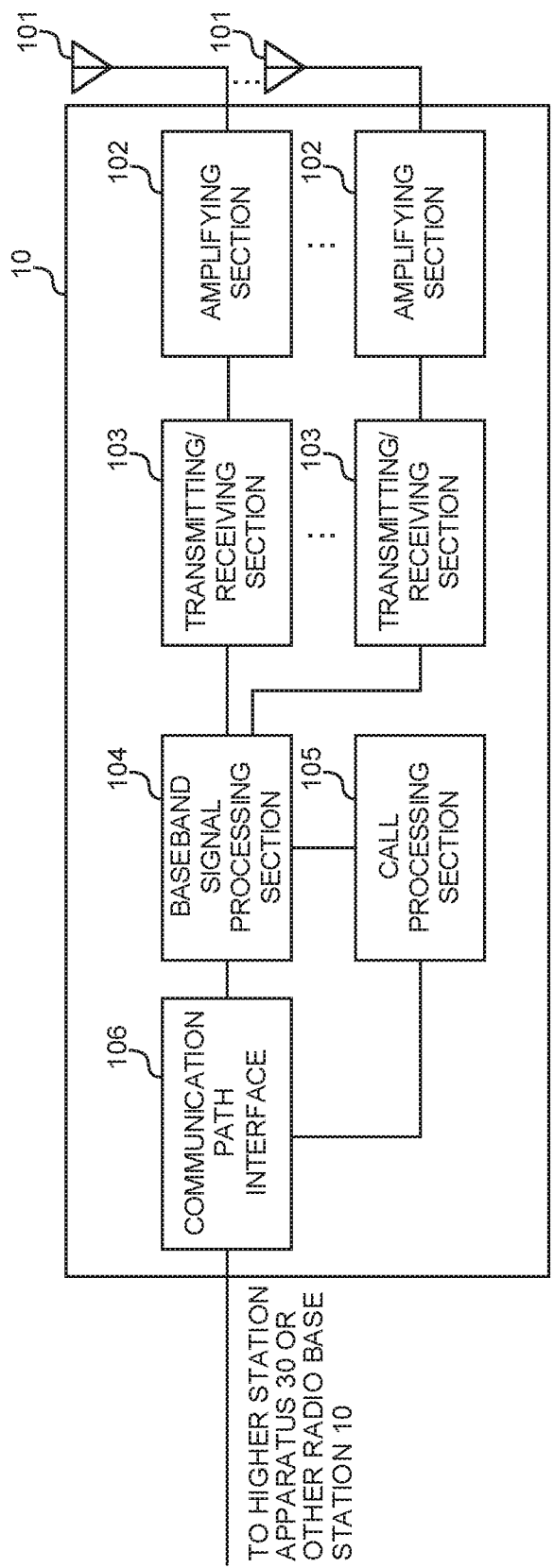
FIG. 12 is a diagram to show an exemplary overall structure of a radio base station according to the present embodiment.

FIG. 12 is a diagram to show an exemplary overall structure of a radio base station according to the present embodiment. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted on DL from the radio base station 10 to a user terminal 20 is input from the higher station apparatus 30 to the baseband signal processing section 104, via the communication path interface 106.

In the baseband signal processing section 104, the user data is subjected to transmission processes, including a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to the transmitting/receiving sections 103. Furthermore, downlink control signals are also subjected to transmission processes such as channel coding and an inverse fast Fourier transform, and forwarded to the transmitting/receiving sections 103, Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101.

A transmitting/receiving section 103 can be constituted by a transmitters/receiver, a transmitting/receiving circuit or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for UL signals, radio frequency signals that are received in the transmitting/receiving antennas 101 are amplified in the amplifying sections 102. The transmitting/receiving sections 103 receive the UL signals amplified in the amplifying sections 102. The received signals are converted into the baseband signal through frequency conversion in the transmitting/receiving sections 103 and output to the baseband signal processing section 104.

In the baseband signal processing section 104, UL data that is included in the UL signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing such as setting up and releasing communication channels, manages the state of the radio base station 10 and manages the radio resources.

The communication path interface section 106 transmits and receives signals to and from the higher station apparatus 30 via a predetermined interface. Also, the communication path interface 106 may transmit and receive signals (backhaul signaling) with neighboring radio base stations 10 via an inter-base station interface (which is, for example, optical fiber in compliance with the CPRI (Common Public Radio Interface), the X2 interface, etc.), In addition, the transmitting/receiving sections 103 transmit DL signals (including at least one of a DL data signal, a DL control signal (DCI), a DL reference signal, and system information (for example, RMSI, SIB, MIB, etc.)) to the user terminal 20, and receive UL signals (including at least one of a UL data signal, a UL control signal and a UL reference signal) from the user terminal 20.

Also, the transmission/receiving sections 103 receive UCI from the user terminal 20, by using an uplink shared channel (for example, PUSCH) or an uplink control channel (for example, a short PUCCH and/or a long PUCCH). This UCI may contain at least one of an HARQ-ACK, CSI, an SR, beam ID information (for example, beam index (BI)), and a buffer status report (BSR) of the DL data channel (for example, PDSCH).

Also, the transmitting/receiving sections 103 may receive the uplink control information using the uplink control channel. In addition, the transmitting/receiving sections 103 may transmit system information (for example, RMSI), which contains index values that indicate one or more resources for the above uplink control channel (PUCCH resources). In addition, the transmitting/receiving sections 103 may transmit downlink control information, which contains index values (for example, ARIs) that indicate one or more resources for the uplink control channel.

Figure 13:
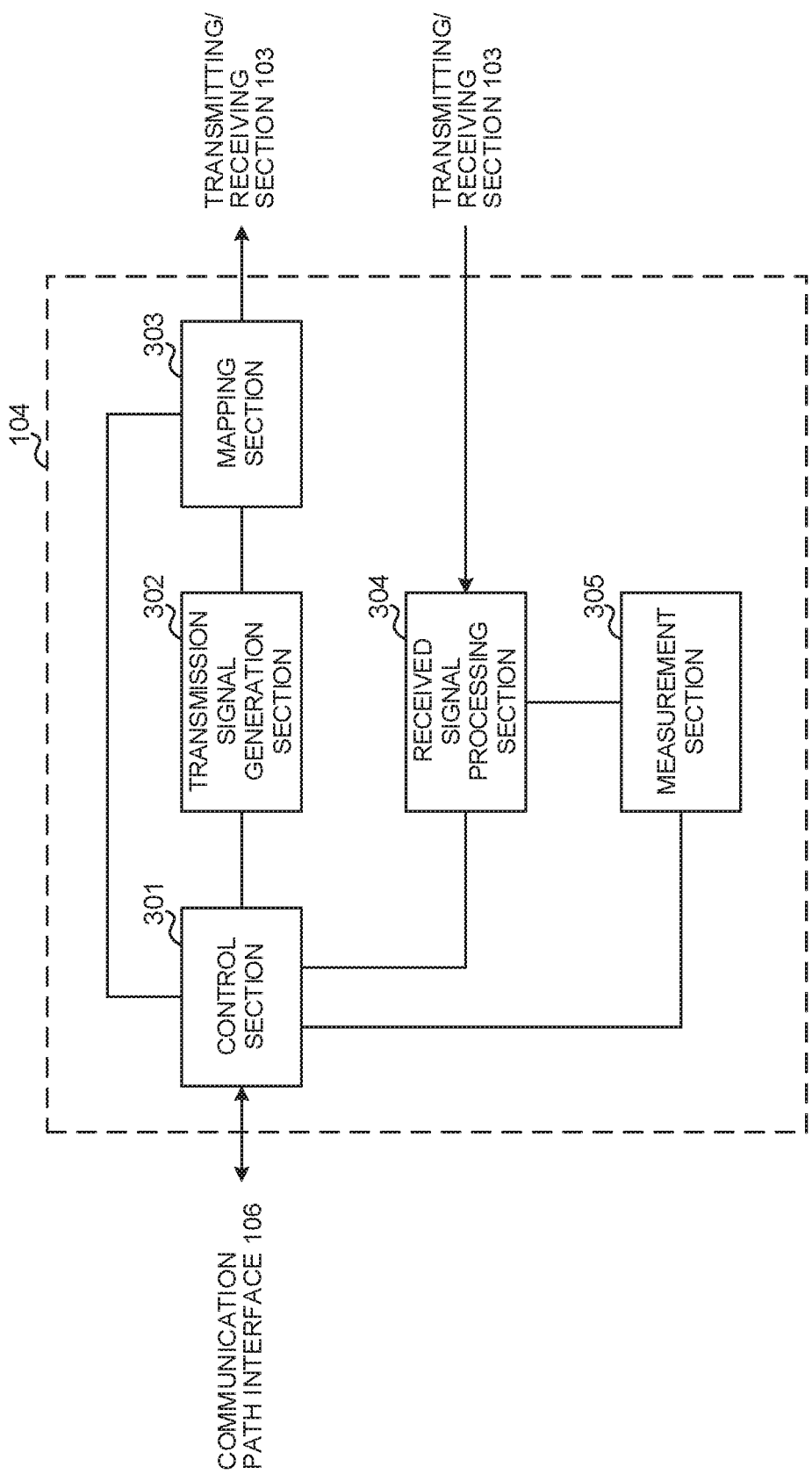
FIG. 13 is a diagram to show an exemplary functional structure of a radio base station according to the present embodiment.

FIG. 13 is a diagram to show an exemplary functional structure of a radio base station according to the present embodiment. Note that, although FIG. 13 primarily shows functional blocks that pertain to characteristic parts of the present embodiment, the radio base station 10 has other functional blocks that are necessary for radio communication as well. As shown in FIG. 13, the baseband signal processing section 104 has a control section 301, a transmission signal generation section 302, a mapping section 303, a received signal processing section 304 and a measurement section 305.

The control section 301 controls the whole of the radio base station 10. The control section 301 controls, for example, generation of DL signals in the transmission signal generation section 302, mapping of DL signals in the mapping section 303, receiving processes (for example, demodulation) for UL signals in the received signal processing section 304, and measurements in the measurement section 305.

To be more specific, the control section 301 performs scheduling for the user terminal 20. To be more specific, the control section 301 may control scheduling and/or retransmission for DL data and/or the uplink shared channel based on UCI (for example, CSI and/or BI) from the user terminal 20.

Also, the control section 301 may control the format of an uplink control channel (for example, long PUCCH and/or short PUCCH), and control transmission of control information related to this uplink control channel.

In addition, the control section 301 may control PUCCH resources. To be more specific, the control section 301 may determine one or more PUCCH resources to report to the user terminal 20. In addition, the control section 301 may control at least one of generation and transmission of system information (for example, RMSI) that indicates at least one of the determined PUCCH resources.

In addition, the control section 301 may determine index values to include in the system information from among a plurality of index values that at least indicate different numbers of PUCCH resources. For example, the control section 301 may determine these index values based on the number of user terminals in the cell.

The control section 301 may control the received signal processing section 304 to perform receiving processes for UCI from the user terminal 20 in accordance with the format of the uplink control channel.

The control section 301 can be constituted by a controller, a control circuit or control apparatus that can be described based on general understanding of the technical field to which the present invention pertains.

The transmission signal generation section 302 generates DL signals (including DL data signals, DL control signals, DL reference signals and so on) based on commands from the control section 301, and outputs these signals to the mapping section 303.

The transmission signal generation section 302 can be constituted by a signal generator, a signal generating circuit or signal generating apparatus that can be described based on general understanding of the technical field to which the present invention pertains.

The mapping section 303 maps the DL signals generated in the transmission signal generation section 302, to predetermined radio resources, as commanded from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding, and so forth) for the UL signals transmitted from the user terminal 20 (including, for example, UL data signals, UL control signals, UL reference signals, and so forth). To be more specific, the received signal processing section 304 may output the received signals and/or the signals after the receiving processes to the measurement section 305. In addition, the received signal processing section 304 performs UCI receiving processes based on which uplink control channel format is specified by the control section 301.

The measurement section 305 conducts measurements with respect to the received signals. The measurement section 305 can be constituted by a measurer, a measurement circuit or measurement apparatus that can be described based on general understanding of the technical field to which the present invention pertains.

The measurement section 305 may measure UL channel quality based on, for example, the received power (for example, RSRP (Reference Signal Received Power)) and/or the received quality (for example, RSRQ (Reference Signal Received Quality)) of UL reference signals. The measurement results may be output to the control section 301.

(User Terminal)

Figure 14:
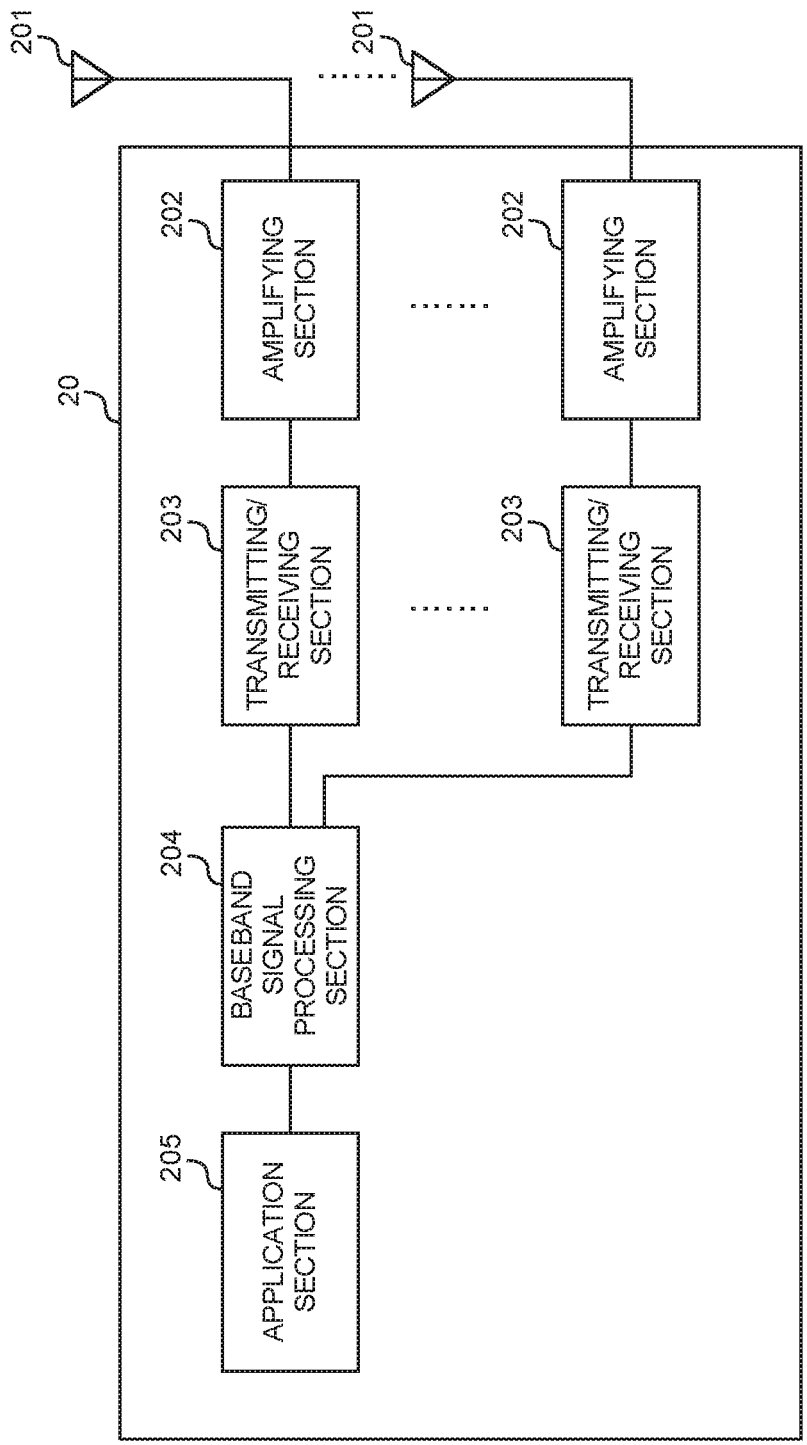
FIG. 14 is a diagram to show an exemplary overall structure of a user terminal according to the present embodiment.

FIG. 14 is a diagram to show an exemplary overall structure of a user terminal according to the present embodiment. A user terminal 20 has a plurality of transmitting/receiving antennas 201 for MIMO communication, amplifying sections 202, transmitting/receiving sections 203, a baseband signal processing section 204 and an application section 205.

Radio frequency signals that are received in multiple transmitting/receiving antennas 201 are amplified in the amplifying sections 202. The transmitting/receiving sections 203 receive DL signals amplified in the amplifying sections 202. The received signals are subjected to frequency conversion and converted into the baseband signal in the transmitting/receiving sections 203, and output to the baseband signal processing section 204.

In the baseband signal processing section 204, the baseband signal that is input is subjected to at least one of an FFT process, error correction decoding, a retransmission control receiving process and so on. The DL data is forwarded to the application section 205. The application section 205 performs processes related to higher layers above the physical layer and the MAC layer. Also, the broadcast information is also forwarded to application section 205.

Meanwhile, UL data is input from the application section 205 to the baseband signal processing section 204. The baseband signal processing section 204 performs transmission processes for retransmission control (for example, an HARQ transmission process), channel coding, rate matching, puncturing, a discrete Fourier transform (DFT) process, an IFFT process and so on, and the result is forwarded to each transmitting/receiving section 203. UCI is also subjected to at least one of channel coding, rate matching, puncturing, DFT process and IFFT process, and forwarded to each transmitting/receiving section 203.

Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

In addition, the transmitting/receiving sections 203 receive DL signals (including at least one of DL data signals, DL control signals (DCI), DL reference signals and system information (for example, RMSI, SIB, MIB, etc.)) for the user terminal 20, and transmit UL signals (including at least one of UL data signals, UL control signals and UL reference signals) from this user terminal 20.

In addition, the transmitting/receiving sections 203 transmit UCI to the radio base station 10 by using an uplink shared channel (for example, PUSCH) or an uplink control channel (for example, short PUCCH and/or long PUCCH).

Also, the transmitting/receiving sections 203 may transmit uplink control information by using an uplink control channel. In addition, the transmitting/receiving sections 203 may receive system information (for example, RMSI), which contains index values that indicate one or more resources for the above uplink control channel (PUCCH resources). In addition, the transmitting/receiving sections 203 may receive downlink control information, which contains index values (for example, ARIs) that indicate one or more resources for the uplink control channel.

A transmitting/receiving section 203 can be constituted by a transmitter/receiver, a transmitting/receiving circuit or transmitting/receiving apparatus that can be described based on general understanding of the technical field to which the present invention pertains. Furthermore, a transmitting/receiving section 203 may be structured as one transmitting/receiving section, or may be formed with a transmitting section and a receiving section.

Figure 15:
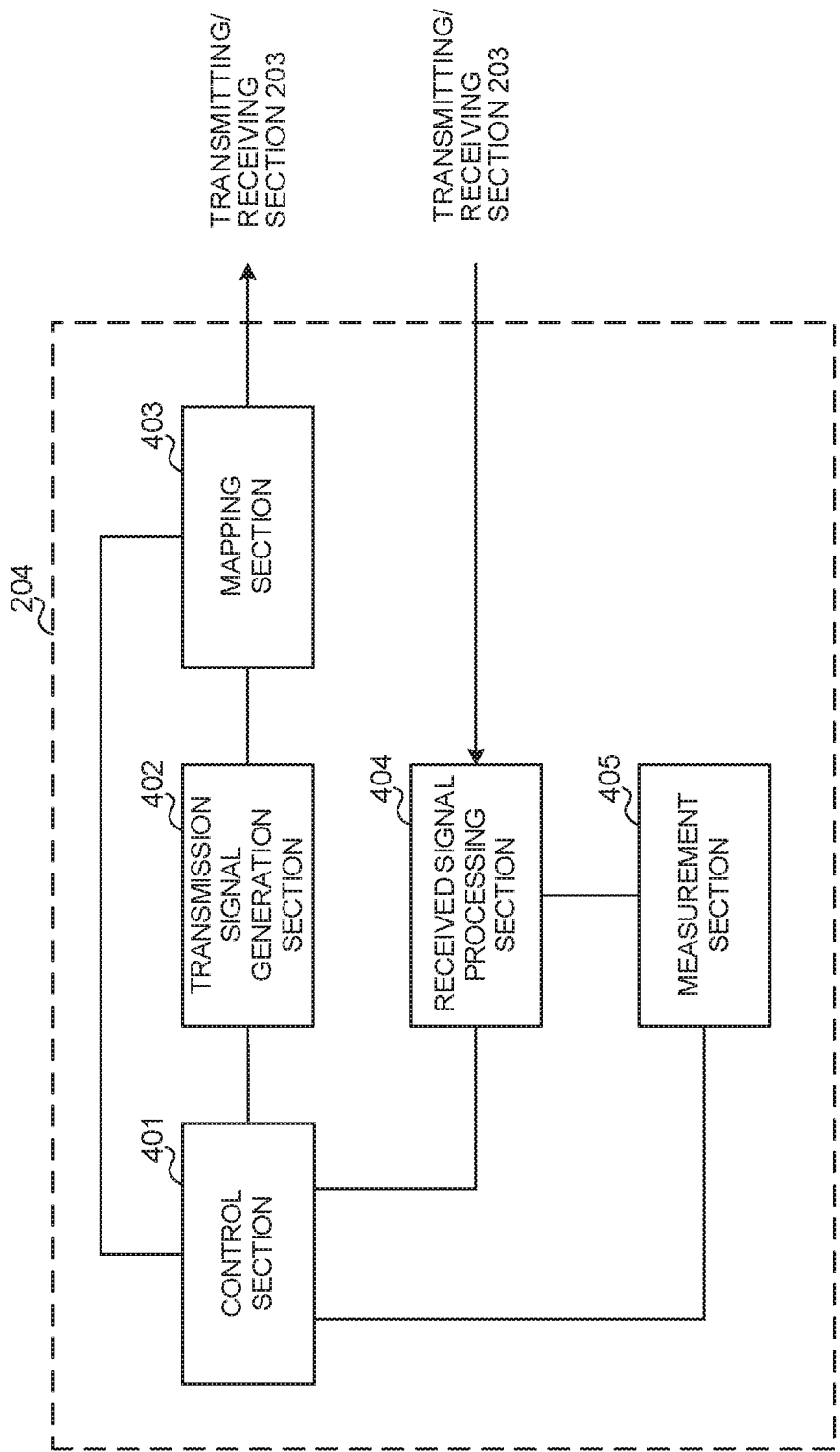
FIG. 15 is a diagram to show an exemplary functional structure of a user terminal according to the present embodiment.

FIG. 15 is a diagram to show an exemplary functional structure of a user terminal according to the present embodiment. Note that, although FIG. 15 primarily shows functional blocks that pertain to characteristic parts of the present embodiment, the user terminal 20 has other functional blocks that are necessary for radio communication as well. As shown in FIG. 15, the baseband signal processing section 204 provided in the user terminal 20 has a control section 401, a transmission signal generation section 402, a mapping section 403, a received signal processing section 404 and a measurement section 405.

The control section 401 controls the whole of the user terminal 20. The control section 401 controls, for example, the generation of UL signals in the transmission signal generation section 402, the mapping of UL signals in the mapping section 403, the DL signal receiving processes in the received signal processing section 404, the measurements in the measurement section 405 and so on.

In addition, the control section 401 controls the uplink control channel which the user terminal 20 uses to transmit UCI, based on explicit commands from the radio base station 10 or implicit decisions by the user terminal 20.

Also, the control section 401 may control the format of an uplink control channel (for example, long PUCCH and/or short PUCCH). The control section 401 may control this format of the uplink control channel based on control information from the radio base station 10. Also, the control section 401 may control the PUCCH format to use to transmit UCI (the format of the uplink control channel) based on information related to fallback.

In addition, the control section 401 may determine PUCCH resources to use to transmit UCI based on at least one of information that is sent through higher layer signaling, downlink control information and implied values.

To be more specific, when UCI is transmitted by using an uplink control channel before an RRC (Radio Resource Control) connection is set up, the control section 401 may determine resources for the uplink control channel for use for transmitting the UCI, based on indices provided in system information (for example, RMSI).

For example, the control section 401 may determine resources for transmitting the uplink control information from among one or more PUCCH resources indicated by the above index values included in system information, based on at least one of bit values in downlink control information and implied values.

Also, the control section 401 may determine a frequency resource for the uplink control channel, using frequency-hopping within a given bandwidth, based on a cell-specific PRB offset (first offset value), which is a value based on the given bandwidth, or 0.

This given bandwidth may be comprised of a given number of physical resource blocks that configure an initial access BWP (a bandwidth portion used by the user terminal 20 to gain initial access).

The cell-specific PRB offset value may have two values or four values. The control section 401 may determine whether to use 2-valued cell-specific PRB offset values or use 4-valued cell-specific PRB offset values based on at least one of the specification (given table), the period of the uplink control channel, and the given bandwidth.

The control section 401 may determine frequency resource for the uplink control channel based on cell-specific PRB offset values, and UE-specific PRB offset values (second offset value(s)), which are indicated by at least one of index values in downlink control information and implied values.

Also, control section 401 may exert control so that, based on index values (for example, RMSI indices) in system information, PUCCH resources are acquired from a table stored in a storage section (see, for example, FIG. 3, FIG. 8 and FIG. 9). Also, the control section 401 may exert control so that, based on the index values (for example, ARIs) in DCI, PUCCH resources are acquired from a table stored in a storage section (see, for example, FIGS. 2A and 2B, and FIG. 10).

The control section 401 can be constituted by a controller, a control circuit or control apparatus that can be described based on general understanding of the technical field to which the present invention pertains.

The transmission signal generation section 402. generates UL signals (including UL data signals, UL controls signals, UL reference signals, UCI and so forth) as commanded from the control section 401 (the generation including, for example, encoding, rate matching, puncturing, modulation, and/or other processes) and outputs these to the mapping section 403. The transmission signal generation section 402 can be constituted by a signal generator, a signal generating circuit or signal generating apparatus that can be described based on general understanding of the technical field to which the present invention pertains.

The mapping section 403 maps the UL signals generated in the transmission signal generation section 402 to radio resources, as commanded from the control section 401, and outputs these to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding, and so forth) for DL signals (including DL data signals, scheduling information, DL control signals, DL reference signals, and so forth). The received signal processing section 404 outputs the information received from the radio base station 10, to the control section 401. The received signal processing section 404 outputs, for example, broadcast information, system information, high layer control information related to higher layer signaling such as RRC signaling, physical layer control information (L1/L2 control information) and so on, to the control section 401.

The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The measurement section 405 measures channel states based on reference signals (for example, CSI-RS) from the radio base station 10, and outputs the measurement results to the control section 401. Note that channel states may be measured on a per CC basis.

The measurement section 405 can be constituted by a signal processor, a signal processing circuit or signal processing apparatus, and a measurer, a measurement circuit or measurement apparatus that can be described based on general understanding of the technical field to which the present invention pertains.

(Hardware Structure)

Note that the block diagrams that have been used to describe the above embodiments show blocks in functional units. These functional blocks (components) may be implemented in arbitrary combinations of hardware and/or software. Also, the method for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire and/or wireless, for example) and using these multiple pieces of apparatus.

Figure 16:
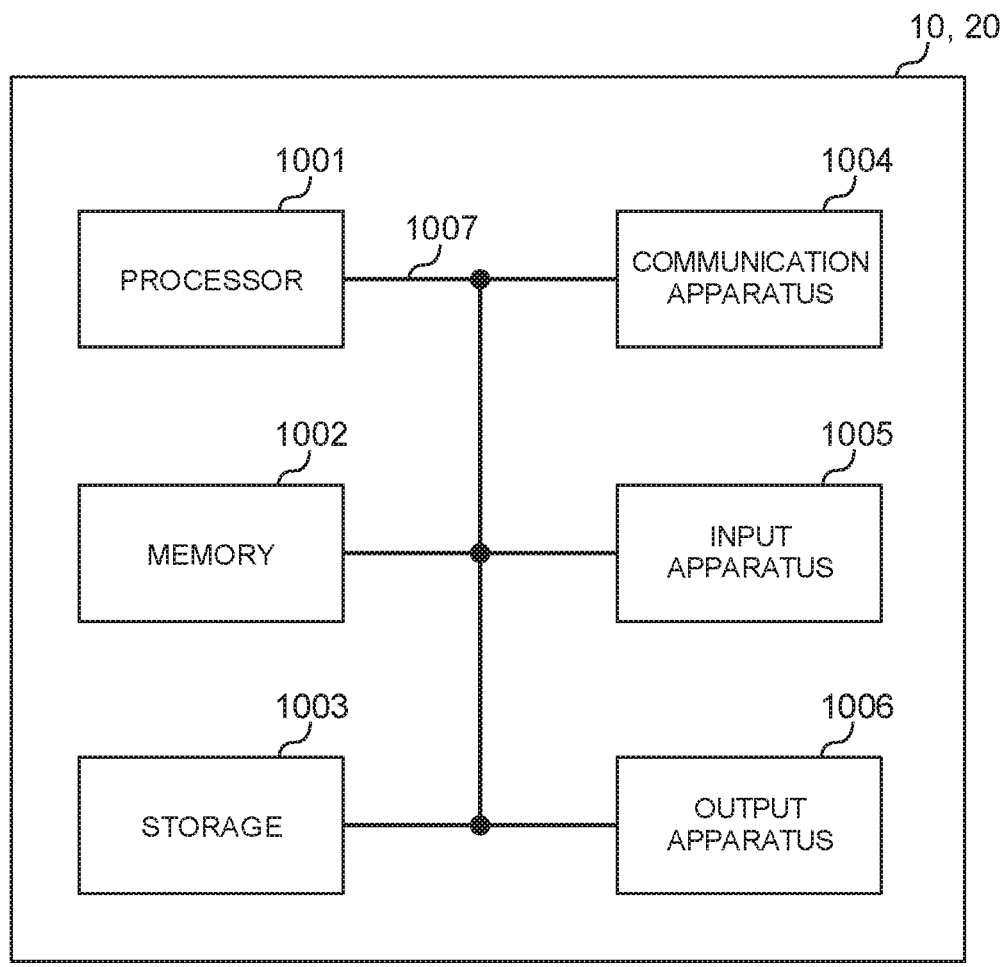
FIG. 16 is a diagram to show an exemplary hardware structure of a radio base station and a user terminal according to the present embodiment.

That is, a radio base station, a user terminal and so on according to an embodiment of the present invention may function as a computer that executes the processes of the radio communication method of the present invention. FIG. 16 is a diagram to show an exemplary hardware structure of a radio base station and a user terminal according to one embodiment of the present invention. Physically, the above-described radio base stations 10 and user terminals 20 may be formed as a computer apparatus that includes a processor 1001, a memory 1002, a storage 1003, communication apparatus 1004, input apparatus 1005, output apparatus 100 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only one processor 1001 is shown, a plurality of processors may be provided. Furthermore, processes may be implemented with one processor, or processes may be implemented simultaneously, in sequence, or in different manners, on one or more processors. Note that the processor 1001 may be implemented with one or more chips.

The functions of the radio base station 10 and the user terminal 20 are implemented by allowing hardware such as the processor 1001 and the memory 1002 to read predetermined software (programs), thereby allowing the processor 1001 to do calculations, the communication apparatus 1004 to communicate, and the memory 1002 and the storage 1003 to read and/or write data.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules, data and so forth from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise, The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory" (primary storage apparatus) and so on. The memory 1002 can store executable programs (program codes), software modules and so on for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media, The storage 1003 may be referred to as "secondary storage apparatus."

The communication apparatus 1004 is hardware (transmitting/receiving apparatus) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these types of apparatus, including the processor 1001, the memory 1002 and others, are connected by a bus 1007 for communicating information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations)

Note that the terminology used in this specification and/or the terminology that is needed to understand this specification may be replaced by other terms that convey the same or similar meanings. For example, "channels" and/or "symbols" may be replaced by "signals" (or "signaling"). Also, "signals" may be "messages." A reference signal may be abbreviated as an "RS," and may be referred to as a "pilot," a "pilot signal" and so on, depending on which standard applies. Furthermore, a "component carrier (CC)" may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or more slots in the time domain. A subframe may be a fixed time duration (for example, 1 ms) not dependent on the numerology.

Furthermore, a slot may be comprised of one or more symbols in the time domain (OFDM (Orthogonal Frequency Division Multiplexing) symbols, SC-FDMA (Single Carrier Frequency Division Multiple Access) symbols, and so on). Also, a slot may be a time unit based on numerology. Also, a slot may include a plurality of minislots. Each mini-slot may consist of one or more symbols in the time domain. Also, a minislot may be referred to as a "subslot."

A radio frame, a subframe, a slot, a minislot and a symbol all represent the time unit to use when communicating signals. A radio frame, a subframe, a slot, a minislot and a symbol may be each called by other equivalent names. For example, one subframe may be referred to as a "transmission time interval (TTI)," or a plurality of consecutive subframes may be referred to as a "TTI," or one slot or one minislot may be referred to as a "TTI" That is, a subframe and/or a TTI may be a subframe (1 ms) in existing LTE, may be a shorter period than 1 ms (for example, one to thirteen symbols), or may be a longer period than 1 ms. Note that the unit to represent a TTI may be referred to as a "slot," a "minislot" and so on, instead of a "subframe."

Here, a TTI refers to the minimum time unit of scheduling in radio communication, for example. For example, in LTE systems, a radio base station schedules the allocation of radio resources for each user terminal (such as the frequency bandwidth and/or the transmission power that can be used by each user terminal) in TTI units. Note that the definition of TTIs is not limited to this.

TTIs may serve as time units for transmitting channel-encoded data packets (transport blocks), code blocks and/or codewords, or may serve as units of processing in scheduling, link adaptation and so on. Note that when a TTI is given, the time interval (for example, the number of symbols) in which transport blocks, code blocks and/or codewords are actually mapped may be shorter than the TTI.

Note that, when one slot or one minislot is referred to as a "TTI," one or more TTIs (that is, one or more slots or one or more minislots) may be the minimum time unit of scheduling. Also, the number of slots (the number of minislots) to constitute his minimum time unit of scheduling may be controlled, A TTI having a time length of 1 ms may be referred to as a "normal TTI" (TTI in LTE Rel. 8 to 12), a "long TTI," a "normal subframe," a "long subframe," and so on. A TTI that is shorter than a normal TTI may be referred to as a "shortened TTI," a "short TTI," a "partial TTI (or a "fractional TTI")," a "shortened subframe," a "short subframe," a "minislot," "a sub-slot" and so on.

Note that a long TTI (for example, a normal TTI, a subframe, etc.) may be replaced with a TTI having a time duration exceeding 1 ms, and a short TTI (for example, a shortened TTI) may be replaced with a TTI having a TTI length less than the TTI length of a long TTI and not less than 1 ms.

A resource block (RB) is the unit of resource allocation in the domain and the frequency domain, and may include one or a plurality of consecutive subcarriers in the frequency domain. Also, an RB may include one or more symbols in the time domain, and may be one slot, one mini-slot, one subframe or one TTI long. One TTI and one subframe may be each comprised of one or more resource blocks. Note that one or more RBs may be referred to as a "physical resource block (PRB (Physical RB))," a "subcarrier group (SCG)," a "resource element group (REG)," a "PRB pair," an "RB pair" and so on.

Furthermore, a resource block may be comprised of one or more resource elements (REs). For example, one RE may be a radio resource field of one subcarrier and one symbol.

Note that the structures of radio frames, subframes, slots, minislots, symbols and so on described above are merely examples. For example, configurations such as the number of subframes included in a radio frame, the number of slots per subframe or radio frame, the number of minislots included in a slot, the number of symbols and RBs included in a slot or a minislot, the number of subcarriers included in an RB, the number of symbols in a TTI, the duration of symbols and the duration of cyclic prefixes (CPs) and so on can be changed in a variety of ways.

Also, the information and parameters described in this specification may be represented in absolute values or in relative values with respect to predetermined values, or may be represented in other information formats. For example, a radio resource may be specified by a predetermined index.

The names used for parameters and so on in this specification are in no respect limiting. For example, since various channels (PDCCH (Physical Uplink Control CHannel), PDCCH (Physical Downlink Control CHannel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. information, signals and so on may be input and/or output via a plurality of network nodes.

The information, signals and so on that are input and/or output may be stored in a specific location (for example, a memory), or may be managed using a management table. The information, signals and so on to be input and/or output can be overwritten, updated or appended. The information, signals and so on that are output may be deleted. The information, signals and so on that are input may be transmitted to other pieces of apparatus.

Reporting of information is by no means limited to the examples/embodiments described in this specification, and other methods may be used as well. For example, reporting of information may be implemented by using physical layer signaling (for example, downlink control information (DCI), uplink control information (UCI)), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)" and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of predetermined information (for example, reporting of information to the effect that "X holds") does not necessarily have to be sent explicitly, and can be sent implicitly (by, for example, not reporting this piece of information, or by reporting a different piece of information).

Decisions may be made in values represented by one bit (0 or 1), may be made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein may be interchangeable.

As used herein, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission point," "receiving point," "transmitting/receiving point," "femto cell," "small cell" and so on.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

A base station and/or a mobile station may be referred to as "transmitting apparatus," "receiving apparatus," and the like.

Furthermore, the radio base stations in this specification may be interpreted as user terminals. For example, each examples/embodiments of the present invention may be applied to a structure in which communication between a radio base station and a user terminal is replaced with communication among a plurality of user terminals (D2D (Device-to-Device)). In this case, user terminals 20 may have the functions of the radio base stations 10 described above. In addition, terms such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Certain actions which have been described in this specification to be performed by base stations may, in some cases, be performed by higher nodes (upper nodes). In a network comprised of one or more network nodes with base stations, it is clear that various operations that are performed to communicate with terminals can be performed by base stations, one or more network nodes (for example, MMEs (Mobility Management Entities), S-GWs (Serving-Gateways) and so on may be possible, but these are not limiting), other than base stations, or combinations of these.

The examples/embodiments illustrated in this specification may be used individually or in combinations, which may be switched depending on the mode of implementation. The order of processes, sequences, flowcharts and so on that have been used to describe the examples/embodiments herein may be re-ordered as long as inconsistencies do not arise. For example, although various methods have been illustrated in this specification with various components of steps in exemplary orders, the specific orders that are illustrated herein are by no means limiting.

The examples/embodiments illustrated in this specification may be applied to systems that use LTE (Long Term Evolution), LTE-A (LTE-Advanced), LTE-B (LTE-Beyond), SUPER 3G, IMT-Advanced, 4G (4th Generation mobile communication system), 5G (5th Generation mobile communication system), FRA (Future Radio Access), New-RAT (Radio Access Technology), NR (New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), and other adequate radio communication methods, and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used only for convenience, as a method of distinguishing between two or more elements. In this way, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical or a combination thereof. For example, "connection" may be interpreted as "access."

As used herein, two elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in the radio frequency range, the microwave range and/or the optical range (both visible and invisible).

In the present specification, the phrase "A and B are different" may mean "A and B are different from each other." The terms such as "leave" "coupled" and the like may be interpreted as well.

When terms such as "include," "comprise" and other variations of these terms are used in this specification or in claims, such terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The invention claimed is:

1. A terminal comprising:
   a receiver that receives system information, the system information including an index value that indicates a first offset value; and
   a processor that determines a frequency resource for an uplink control channel using frequency-hopping, based on the first offset value and a second offset value, the second offset value being based on at least one of a field value in a downlink control information and an index value of a control channel element,
   wherein the processor determines an initial cyclic shift index for the uplink control channel based on at least one of the field value in the downlink control information and the index value of the control channel element.

2. The terminal according to claim 1, wherein the first offset value is a fixed value or a value that is based on a bandwidth.

3. The terminal according to claim 1, wherein the first offset value is a value that is based on a number of physical resource blocks that configure a bandwidth part used in an initial access of the terminal.

4. A base station comprising:
   a transmitter that transmits system information, the system information including an index value that indicates a first offset value;
   a receiver that receives an uplink control channel using frequency-hopping in a frequency resource determined based on the first offset value and a second offset value, the second offset value being based on at least one of a field value in a downlink control information and an index value of a control channel element; and
   a processor that indicates to a terminal to determine an initial cyclic shift index for the uplink control channel based on at least one of the field value in the downlink control information and the index value of the control channel element.

5. A radio communication method of a terminal comprising:
   receiving system information, the system information including an index value that indicates a first offset value;
   determining a frequency resource for an uplink control channel using frequency-hopping, based on the first offset value and a second offset value, the second offset value being based on at least one of a field value in a downlink control information and an index value of a control channel element; and determining an initial cyclic shift index for the uplink control channel based on at least one of the field value in the downlink control information and the index value of the control channel element.

\* \* \* \* \*